(12) United States Patent
Harrison

(10) Patent No.: US 9,627,863 B1
(45) Date of Patent: Apr. 18, 2017

(54) ELECTRICAL PANEL BARRICADE

(71) Applicant: Joel Harrison, Rentz, GA (US)

(72) Inventor: Joel Harrison, Rentz, GA (US)

( * ) Notice: Subject to any disclaimer, the term of this patent is extended or adjusted under 35 U.S.C. 154(b) by 0 days.

(21) Appl. No.: 14/937,236

(22) Filed: Nov. 10, 2015

(51) Int. Cl.
*H02B 1/30* (2006.01)
*H02B 1/38* (2006.01)

(52) U.S. Cl.
CPC ..................................... *H02B 1/38* (2013.01)

(58) Field of Classification Search
None
See application file for complete search history.

(56) References Cited

U.S. PATENT DOCUMENTS

| | | | |
|---|---|---|---|
| 4,616,177 A | 10/1986 | McClain | |
| 4,906,059 A | 3/1990 | Reiner | |
| 5,250,752 A | 10/1993 | Cutright | |
| 5,292,189 A | 3/1994 | Lau | |
| 5,315,654 A * | 5/1994 | Kraft | H04M 1/15 340/545.6 |
| 5,369,548 A * | 11/1994 | Combs | H02B 1/40 174/148 |
| 5,378,058 A * | 1/1995 | Tessmer | H02B 1/50 312/223.6 |
| 5,498,073 A | 3/1996 | Charbonneau | |
| 5,930,355 A * | 7/1999 | Poston | H04M 1/18 379/437 |
| 5,984,128 A * | 11/1999 | Pate | H02B 1/06 220/480 |
| 6,005,188 A * | 12/1999 | Teichler | H02B 1/50 174/50 |
| D584,251 S | 1/2009 | Lewis, II | |
| 8,091,970 B2 | 1/2012 | Francisquini | |
| 2015/0263492 A1* | 9/2015 | Nguyen | H02B 1/46 174/563 |

FOREIGN PATENT DOCUMENTS

WO WO2005034302 A2 4/2005

* cited by examiner

*Primary Examiner* — Dimary Lopez Cruz
(74) *Attorney, Agent, or Firm* — Kyle A. Fletcher, Esq.

(57) ABSTRACT

The electrical panel barricade is a three sided cabinet that prevents unauthorized access to electrical panels that are uncovered for maintenance purposes. The electrical panel barricade is attached directly to the uncovered electrical panel using two adjustable clamping bars. The electrical panel barricade can be installed to protect an uncovered electrical panel that needs to be left unattended. The electrical panel barricade can be installed as a temporary closure to accommodate electrical testing equipment that may not fit into the original electrical panel. The electrical panel barricade comprises a door, a left panel, a right panel, a left locking wing, a right locking wing, a top member, and a bottom member.

14 Claims, 4 Drawing Sheets

ELECTRICAL PANEL BARRICADE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of electrical conduits and housings, more specifically, a structure configured for use in controlling access to electrical cabinets and panels.

SUMMARY OF INVENTION

The electrical panel barricade is a three sided cabinet that prevents unauthorized access to electrical panels that are uncovered for maintenance purposes. The electrical panel barricade is attached directly to the uncovered electrical panel using two adjustable clamping bars. The electrical panel barricade can be installed to protect an uncovered electrical panel that needs to be left unattended. The electrical panel barricade can be installed as a temporary closure to accommodate electrical testing equipment that may not fit into the original electrical panel.

These together with additional objects, features and advantages of the electrical panel barricade will be readily apparent to those of ordinary skill in the art upon reading the following detailed description of the presently preferred, but nonetheless illustrative, embodiments when taken in conjunction with the accompanying drawings.

In this respect, before explaining the current embodiments of the electrical panel barricade in detail, it is to be understood that the electrical panel barricade is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the electrical panel barricade.

It is therefore important that the claims be regarded as including such equivalent construction insofar as they do not depart from the spirit and scope of the electrical panel barricade. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
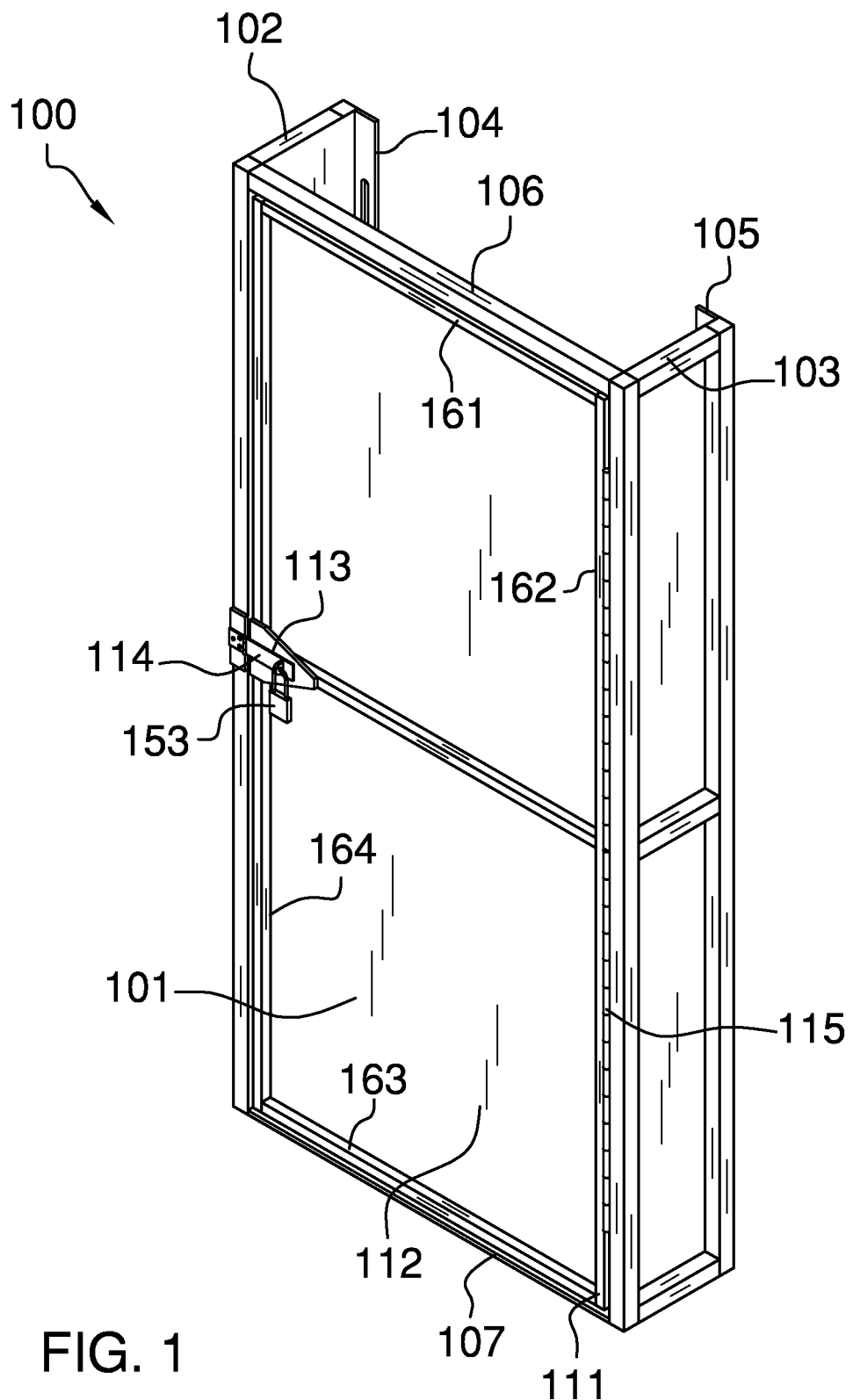
FIG. 1 is a perspective view of an embodiment of the disclosure.
Figure 2:
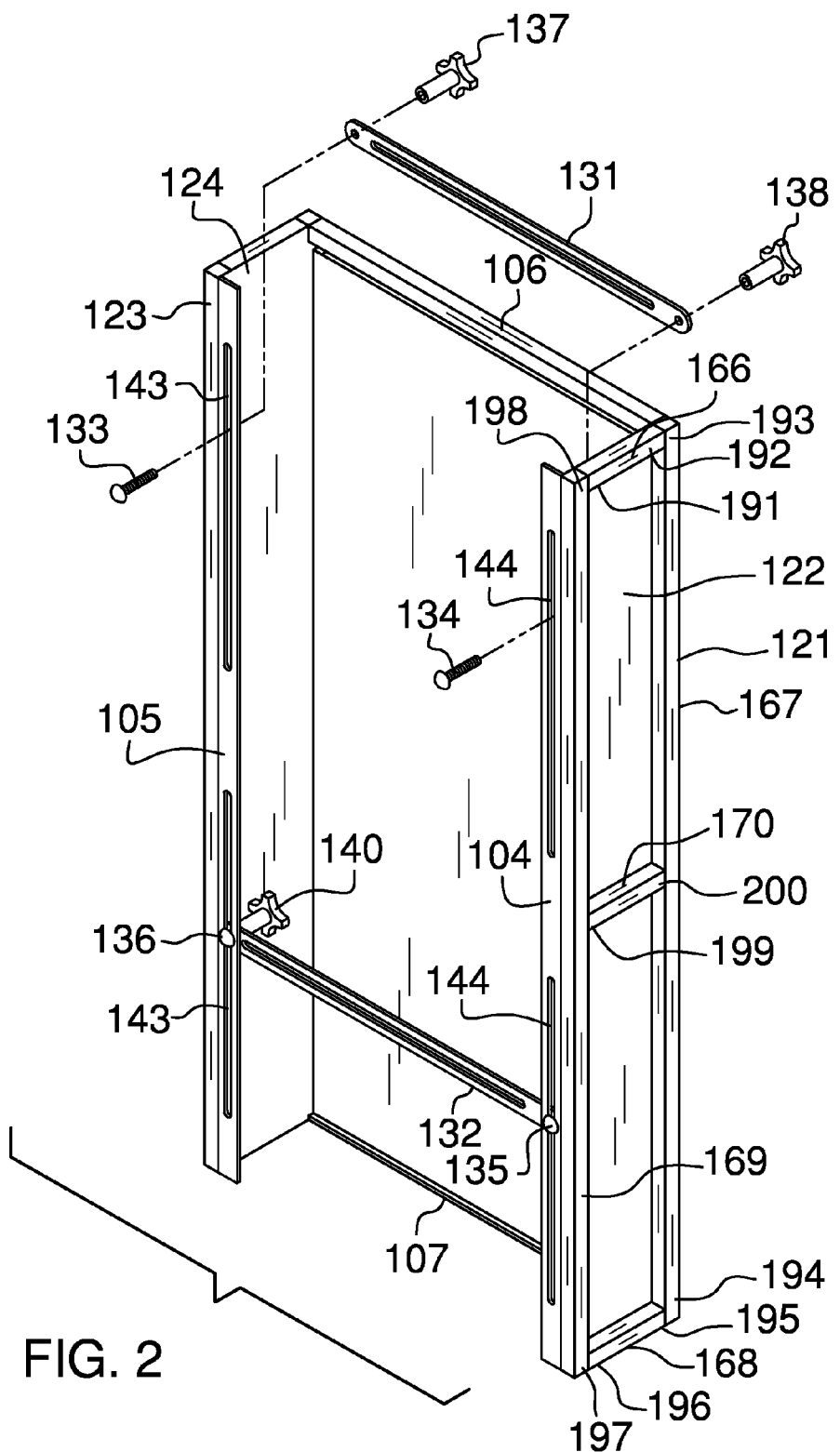
FIG. 2 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5.

The electrical panel barricade 100 (hereinafter invention) comprises a door 101, a left panel 102, a right panel 103, a left locking wing 104, a right locking wing 105, a top member 106, and a bottom member 107. The invention is adapted for use with an electrical panel 151. The invention 100 is placed on the floor 152 in front of the electrical panel 151 such that access to the electrical panel 151 is barricaded by the left panel 102, right panel 103 and the door 101. Access to the electrical panel 151 is gained through the door 101. The invention 100 is attached directly to the electrical panel 151 using a method discussed elsewhere in this disclosure. Once the invention 100 is attached to the electrical panel 151, the door 101 is locked which prevents unauthorized access to the electrical panel 151 during maintenance activities.

The door 101 comprises a door frame 111, a door cover 112, a lock plate 113, a lock latch 114, and one or more cabinet hinges 115. The door frame 111 further comprises a first member 161, a second member 162, a third member 163, a fourth member 164 and a fifth member 165. The first member 161 is a square metal tube that is further defined by a first end 181 and a second end 182. The second member 162 is a square metal tube that is further defined by a third end 183 and a fourth end 184. The third member 163 is a square metal tube that is further defined by a fifth end 185 and a sixth end 186. The fourth member 164 is a square metal tube that is further defined by a seventh end 187 and an eighth end 188. The fifth member 165 is a square metal tube that is further defined by a ninth end 189 and a tenth end 190.

The door frame 111 is a rectangular structure. The span of the first member 161 equals the span of the third member 163. The span of the second member 162 equals the span of the fourth member 164. The door frame 111 is assembled as follows. The first end 181 of the first member 161 is attached to the eighth end 188 of the fourth member 164. The second end 182 of the first member 161 is attached to the third end 183 of the second member 162. The fourth end 184 of the second member 162 is attached to the fifth end 185 of the third member 163. The sixth end 186 of the third member 163 is attached to the seventh end 187 of the fourth member 164. The ninth end 189 of the fifth member 165 is attached to the fourth member 164 such that the fifth member 165 projects perpendicularly away from the fourth member 164 towards the second member 162. The tenth end 190 of the fifth member 165 is attached to the second member 162 such that the fifth member 165 projects perpendicularly away from the second member 162 towards the fourth member 164. The joints and attachments described in this paragraph are welded.

The left panel 102 further comprises a left panel frame 121 and a left panel cover 122. The left panel frame 121 further comprises a sixth member 166, a seventh member 167, an eighth member 168, a ninth member 169, and a tenth member 170. The sixth member 166 is a square metal tube that is further defined by an eleventh end 191 and a twelfth end 192. The seventh member 167 is a square metal tube that is further defined by a thirteenth end 193 and a fourteenth end 194. The eighth member 168 is a square metal tube that is further defined by a fifteenth end 195 and a sixteenth end 196. The ninth member 169 is a square metal tube that is further defined by a seventeenth end 197 and an eighteenth end 198. The tenth member 170 is a square metal tube that is further defined by a nineteenth end 199 and a twentieth end 200. The left panel frame 121 is assembled as follows. The eleventh end 191 of the sixth member 166 is attached to the eighteenth end 198 of the ninth member 169.

The twelfth end 192 of the sixth member 166 is attached to the thirteenth end 193 of the seventh member 167. The fourteenth end 194 of the seventh member 167 is attached to the fifteenth end 195 of the eighth member 168. The sixteenth end 196 of the eighth member 168 is attached to the seventeenth end 197 of the ninth member 169. The nineteenth end 199 of the tenth member 170 is attached to the ninth member 169 such that the tenth member 170 projects perpendicularly away from the ninth member 169 towards the seventh member 167. The twentieth end 200 of the tenth member 170 is attached to the seventh member 167 such that the tenth member 170 projects perpendicularly away from the seventh member 167 towards the ninth member 169. The joints and attachments described in this paragraph are welded. The left panel cover 122 is a rectangular metal sheet with the same dimensions as the rectangular structure of the left panel frame 121. The left panel cover 122 is attached to the left panel frame 121 by welding. The left locking wing 104 is a flat metal bar that has milled in it a first milled slot 143 that is sized to receive one or more carriage bolts that are discussed elsewhere in this disclosure. The left locking wing 104 is welded to the ninth member 169 such that the left locking wing 104 projects perpendicularly away from the ninth member 169 towards the right panel 103.

The right panel 103 further comprises a right panel frame 123 and a right panel cover 124. The right panel frame 123 further comprises an eleventh member 171, a twelfth member 172, a thirteenth member 173, a fourteenth member 174, and a fifteenth member 175. The eleventh member 171 is a square metal tube that is further defined by a twenty first end 201 and a twenty second end 202. The twelfth member 172 is a square metal tube that is further defined by a twenty third end 203 and a twenty fourth end 204. The thirteenth member 173 is a square metal tube that is further defined by a twenty fifth end 205 and a twenty sixth end 206. The fourteenth member 174 is a square metal tube that is further defined by a twenty seventh end 207 and a twenty eighth end 208. The fifteenth member 175 is a square metal tube that is further defined by a twenty ninth end 209 and a thirtieth end 210. The right panel frame 123 is assembled as follows. The twenty first end 201 of the eleventh member 171 is attached to the twenty eighth end 208 of the fourteenth member 174. The twenty second end 202 of the eleventh member 171 is attached to the twenty third end 203 of the twelfth member 172. The twenty fourth end 204 of the twelfth member 172 is attached to the twenty fifth end 205 of the thirteenth member 173. The twenty sixth end 206 of the thirteenth member 173 is attached to the twenty seventh end 207 of the fourteenth member 174. The twenty ninth end 209 of the fifteenth member 175 is attached to the fourteenth member 174 such that the tenth member 170 projects perpendicularly away from the fourteenth member 174 towards the twelfth member 172. The thirtieth end 210 of the fifteenth member 175 is attached to the seventh member 167 such that the tenth member 170 projects perpendicularly away from the twelfth member 172 towards the fourteenth member 174.

The joints and attachments described in this paragraph are welded. However, it shall be noted that rivets may be employed in lieu of welds. The right panel cover 124 is a rectangular metal sheet with the same dimensions as the rectangular structure of the right panel frame 123. The right panel cover 124 is attached to the right panel frame 123 by welding. The right locking wing 105 is a flat metal bar that has milled in it a second milled slot 144 that is sized to receive one or more carriage bolts that are discussed elsewhere in this disclosure. The right locking wing 105 is welded to the twelfth member 172 such that the right locking wing 105 projects perpendicularly away from the twelfth member 172 towards the left panel 102.

The left panel 102 and the right panel 103 are attached to each other using the top member 106 and the bottom member 107. The top member 106 is a square metal tube that is further defined by a thirty fifth end 215 and a thirty sixth end 216. The bottom member 107 is a square metal tube that is further defined by a thirty seventh end 217 and a thirty eighth end 218. The thirty fifth end 215 is attached to the thirteenth end 193 of the seventh member 167. The thirty sixth end 216 is attached to the twenty eighth end 208 of the fourteenth member 174. The thirty seventh end 217 is attached to the fourteenth end 194 of the seventh member 167. The thirty eighth end 218 is attached to the twenty seventh end 217 of the fourteenth member 174. The span between the top member 106 and the bottom member 107 is such that the door 101 will fit between the top member 106 and the bottom member 107. The joints and attachments described in this paragraph are welded.

The door cover 112 is a rectangular metal sheet with the same dimensions as the rectangular structure of the door frame 111. The door cover 112 is attached to the door frame 112 by welding. The second member 162 of the door 101 is attached to the fourteenth member 174 of the right panel 103 using one or more cabinet hinges 115, also commonly referred to as piano hinges. The one or more cabinet hinges 115 allow the door 101 to swing freely away from the left panel 102 to provide access to the interior of the invention 100.

Figure 3:
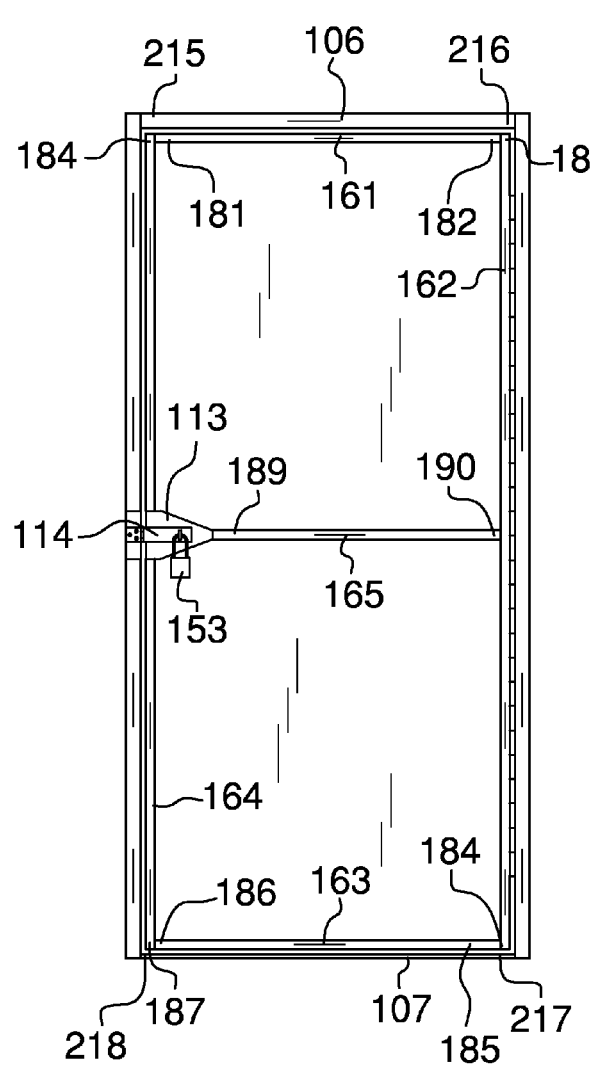
FIG. 3 is a front view of an embodiment of the disclosure.
Figure 4:
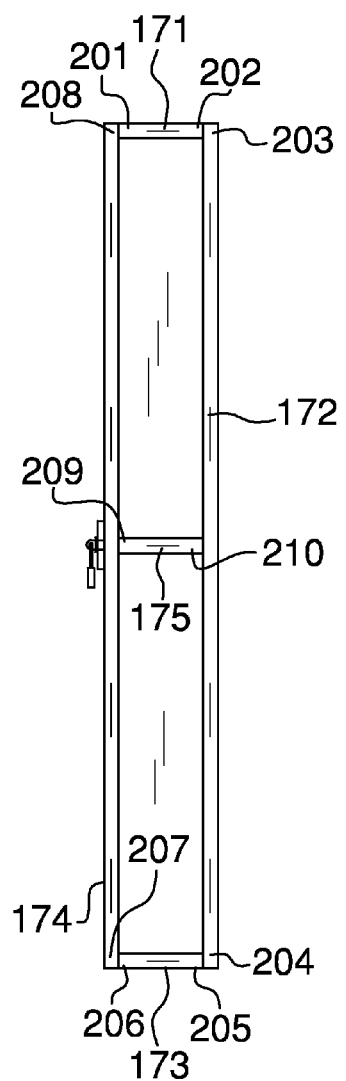
FIG. 4 is a side view of an embodiment of the disclosure.
Figure 5:
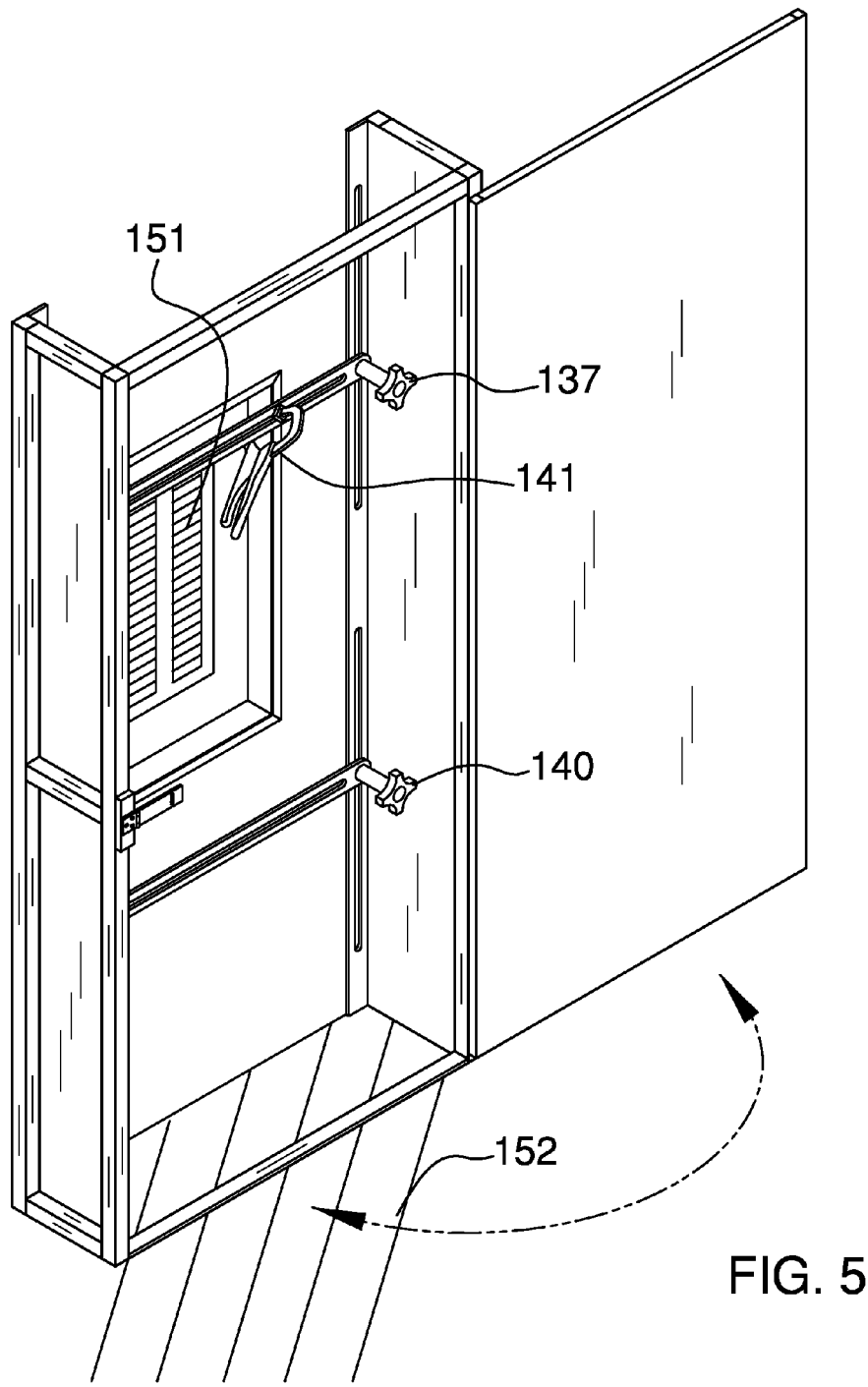
FIG. 5 is an in use view of an embodiment of the disclosure.

As shown in FIG. 3, the lock plate 113 is a triangular metal plate that is welded to the ninth end 189 of the fifth member 165. The lock plate 113 provides a mounting location for the lock latch 114. The lock latch 114 is a commercially available gatehouse safety hasp that allows the door 101 to be secured to the left panel 102 using a commercially available padlock. To attach the lock latch 114 to the invention 100 the hasp portion of the gatehouse safety hasp is welded to the seventh member 167 of the left panel 102. The metal loop portion of the gate house safety hasp is welded to the lock plate 113.

The invention 100 is attached to the electrical panel 151 using a first slotted flat bar 131, a second slotted flat bar 132, a first carriage bolt 133, a second carriage bolt 134, a third carriage bolt 135, a fourth carriage bolt 136, a first threaded knob 137, a second threaded knob 138, a third threaded knob, a fourth threaded knob 140, a first clamp 141, and a second clamp. The first slotted bar 131 is a commercially available slotted metal flat bar. The second slotted flat bar 132 is a commercially available slotted metal flat bar. The first slotted flat bar 131 is attached to the invention 100 by placing the slot of the first slotted flat bar 131 over the first milled slot 143 and the second milled slot 144. The first carriage bolt 133 is placed through slot of the first slotted flat bar 131 and the second milled slot 144. The first threaded knob 137 is screwed over the first carriage bolt 133 to hold the first carriage bolt 133 in position. The second carriage bolt 134 is placed through slot of the first slotted flat bar 131 and the first milled slot 143. The second threaded knob 138 is screwed over the second carriage bolt 134 to hold the second carriage bolt 134 in position. The third carriage bolt 135 is placed through slot of the second slotted flat bar 132 and the first milled slot 143. The third threaded knob is screwed over the third carriage bolt 135 to hold the third carriage bolt 135 in position. The fourth carriage bolt 136 is placed through slot of the second slotted flat bar 132 and the second milled slot 144. The fourth threaded knob 140 is screwed over the fourth carriage bolt 136 to hold the fourth carriage bolt 136 in position.

Once the invention 100 is assembled 100, the invention 100 is held in position to barricade the electrical panel 151 by using a first clamp 141 to clamp the first slotted flat bar 131 to the electrical panel 151 and a second clamp to clamp the second slotted flat bar 132 to the electrical panel 151. Once the invention 100 is secured to the electrical panel 151, access to the electrical panel 151 is barricaded by attaching the padlock 153 to the lock latch 114.

All the components discussed in this disclosure are made of metal. Suitable metals include, but are not limited to, steel or aluminum. Because of its lighter weight aluminum is preferred.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A barricade comprising:
a door, a left panel, a right panel, a left locking wing, a right locking wing, a top member, and a bottom member;
wherein the barricade is adapted for use in barricading access to an electrical panel;
wherein the barricade can be locked;
wherein the barricade is attached directly to the electrical panel;
wherein the barricade is temporarily attached directly to the electrical panel through the use of at least one clamp;
wherein the door comprises a door frame, a door cover, a lock plate, a lock latch, and one or more cabinet hinges;
wherein the left panel further comprises a left panel frame and a left panel cover;
wherein the right panel further comprises a right panel frame and a right panel cover;
wherein the left panel and the right panel are attached to each other using the top member and the bottom member;
wherein the left locking wing is a flat metal bar that has a first milled slot;
wherein the right locking wing is a flat metal bar that has a second milled slot;
wherein a span between the top member and the bottom member is such that the door will fit between the top member and the bottom member;
wherein the barricade further comprises a first slotted flat bar, a second slotted flat bar, a first carriage bolt, a second carriage bolt, a third carriage bolt, a fourth carriage bolt, a first threaded knob, a second threaded knob, a third threaded knob, a fourth threaded knob, a first clamp, and a second clamp.

2. The barricade according to claim 1 wherein the first slotted bar is a slotted metal flat bar; wherein the second slotted flat bar is a slotted metal flat bar.

3. The barricade according to claim 2 wherein the first slotted flat bar is attached to the first milled slot using the first carriage bolt and the first threaded knob;
wherein the first slotted flat bar is attached to the second milled slot using the second carriage bolt and the second threaded knob;
wherein the second slotted flat bar is attached to the second milled slot using the third carriage bolt and the third threaded knob;
wherein the second slotted flat bar is attached to the first milled slot using the fourth carriage bolt and the fourth threaded knob.

4. The barricade according to claim 3 wherein the first clamp attaches the first slotted bar to the electrical panel;
wherein the second clamp attaches the second slotted bar to the electrical panel.

5. The barricade according to claim 4 wherein the door frame further comprises a first member, a second member, a third member, a fourth member and a fifth member.

6. The barricade according to claim 5 wherein the span of the first member equals the span of the third member;
wherein the span of the second member equals the span of the third member;
wherein the first member is attached to the second member and the fourth member;
wherein the second member is further attached to the third member;

wherein the third member is further attached to the fourth member;

wherein the fifth member is attached to the second member and the fourth member.

7. The barricade according to claim 6 wherein the door cover is attached to the door frame.

8. The barricade according to claim 7 wherein the left panel frame further comprises a sixth member, a seventh member, an eighth member, a ninth member, and a tenth member.

9. The barricade according to claim 8 wherein the span of the sixth member equals the span of the eighth member;

wherein the span of the seventh member equals the span of the ninth member;

wherein the sixth member is attached to the seventh member and the ninth member;

wherein the seventh member is further attached to the eighth member;

wherein the eighth member is further attached to the ninth member;

wherein the tenth member is attached to the seventh member and the ninth member;

wherein the left locking wing is attached to the ninth member.

10. The barricade according to claim 9 wherein the left panel cover is attached to the left panel frame.

11. The barricade according to claim 10 wherein the right panel frame further comprises an eleventh member, a twelfth member, an thirteenth member, a fourteenth member, and a fifteenth member.

12. The barricade according to claim 11 wherein the span of the eleventh member equals the span of the thirteenth member;

wherein the span of the twelfth member equals the span of the fourteenth member;

wherein the eleventh member is attached to the twelfth member and the fourteenth member;

wherein the twelfth member is further attached to the thirteenth member;

wherein the thirteenth member is further attached to the fourteenth member;

wherein the fifteenth member is attached to the twelfth member and the fourteenth member;

wherein the right locking wing is attached to the twelfth member.

13. The barricade according to claim 12 wherein the right panel cover is attached to the right panel frame.

14. The barricade according to claim 13 wherein the second member of the door frame is attached to the fourteenth member of the right panel using one or more cabinet hinges;

wherein the lock plate is a triangular metal plate that is attached to the fifth member;

wherein the lock latch further comprises a hasp portion and a metal loop portion;

wherein the hasp portion is attached to the seventh member of the left panel;

wherein the metal loop portion is attached to the lock plate.

* * * * *